United States Patent [19]

Nishimoto et al.

[11] Patent Number: 5,360,077
[45] Date of Patent: Nov. 1, 1994

[54] ELECTRIC POWER STEERING APPARATUS

[75] Inventors: Mitsuhiko Nishimoto, Yoshino; Hirofumi Matsuoka, Souraku; Hidetoshi Tabuse, Wakayama, all of Japan

[73] Assignee: Koyo Seiko Co., Ltd., Osaka, Japan

[21] Appl. No.: 69,070

[22] Filed: May 28, 1993

[30] Foreign Application Priority Data

Jun. 1, 1992 [JP] Japan ............................ 4-044158[U]
Jul. 28, 1992 [JP] Japan ................................. 4-222144

[51] Int. Cl.⁵ .............................................. B62D 5/04
[52] U.S. Cl. .................................. 180/79.1; 180/142; 364/424.05
[58] Field of Search ...................... 180/79.1, 142, 143; 364/424.05, 424.03, 424.04

[56] References Cited

U.S. PATENT DOCUMENTS

| | | | |
|---|---|---|---|
| 4,621,327 | 11/1986 | Dolph et al. | 364/424 |
| 4,869,334 | 9/1989 | Marumoto et al. | 180/79.1 |
| 4,972,320 | 11/1990 | Sugiura et al. | 180/79.1 |
| 5,202,830 | 4/1993 | Tsurumiya et al. | 180/79.1 |
| 5,226,499 | 7/1993 | Kanazawa et al. | 180/79.1 |

*Primary Examiner*—Karin L. Tyson
*Assistant Examiner*—Victor E. Johnson
*Attorney, Agent, or Firm*—Darby & Darby

[57] ABSTRACT

Disclosed is an electric power steering apparatus, in which a gate circuit is provided that allows the actuation of a motor and a clutch only when a signal indicating normal operation is obtained from both of two controllers of dual configuration and that immediately disables steering assisting action when either one or both of the two controllers have gone out of control, and in which a power supply for supplying power to the controllers is connected in common to the two controllers, to prevent a latch-up of either controller.

4 Claims, 4 Drawing Sheets

ELECTRIC POWER STEERING APPARATUS

BACKGROUND OF THE INVENTION

1. Field of the Invention

The present invention relates to an electric power steering apparatus that uses electric power to assist the force required to steer a vehicle.

2. Description of the Related Art

There has been developed an electric power steering apparatus in which a vehicle speed sensor is used to detect vehicle speed and a torque sensor to detect the steering torque applied at the steering wheel, and in which, when the applied steering torque is detected being outside a prescribed dead zone, a driving current of the magnitude determined according to the detected steering torque and vehicle speed is supplied to drive a steering assisting motor whose rotational force is used to assist the force required to steer the vehicle, thereby providing a comfortable steering feel to the driver.

The steering assisting power is controlled on the basis of the results of the operations performed by a controller such as a CPU. In order to ensure the system safety against malfunctions, such as runaway, of the CPU, there has been proposed, for example, a technique of dual-CPU configuration in which the system is constructed using two CPUs, i.e. a main CPU and a sub CPU that operate with separate power supply circuits.

In electric power steering apparatus employing such a dual-CPU configuration, the main CPU calculates the value of the driving current for the motor on the basis of the detected steering torque and vehicle speed, thereby controlling the steering assisting power; on the other hand, the sub CPU performs the same operations as the main CPU does, and the results of the operations are compared with those obtained from the main CPU, thereby monitoring the inputs/outputs to and from the main CPU for the detection of a failure in the main CPU.

If the sub CPU detects a failure in the main CPU, the sub CPU performs control that involves deactivating the motor, performing a fail-safe operation, etc. to protect the system safety.

In the electric power steering apparatus employing the dual-CPU configuration as described above, the basic function of the dual-CPU system is such that the main CPU controls the steering assisting power while the sub CPU monitors the operation of the main CPU. In addition to this basic function, the dual-CPU system has the function that the main and sub CPUs mutually monitor the operation of each other by transferring watchdog pulses between them, each CPU monitoring the watchdog pulses sent from the other CPU.

However, in the above prior art electric power steering apparatus, while the system safely can be protected by the sub CPU against failures, such as runaway, of the main CPU, the main CPU would be left unmonitored in the case of run-away of the sub CPU, and the system safely cannot be secured if the two CPUs have gone out of control, because of exposure to a strong electric field for example.

Furthermore, since the main and sub CPUs between which watchdog pulses are transferred operate with separate power supply circuits, the prior art configuration has involved the possibility that one CPU may cause a latch-up of the other CPU when the supply voltages are different, which results in unstable operation.

SUMMARY OF THE INVENTION

The present invention has been made to resolve the above enumerated problems, and it is an object of the invention to provide an electric power steering apparatus in which two controllers constituting a dual-control system are connected to a common power supply circuit, and in which a circuit is provided that acts to isolate either a motor driving circuit or a clutch driving circuit or both of these circuits from the power supply when an excessive voltage has occurred in the power supply circuit, with further provision of circuits that perform power-on reset operations on the respective controllers independently of each other, thereby enhancing the mutual monitoring Function of the dual-control system for improved safety and ensuring stable operation of the two controllers connected to the common power supply circuit.

The above and further objects and features of the invention will more fully be apparent from the following detailed description with accompanying drawings.

DESCRIPTION OF THE PREFERRED EMBODIMENTS

The preferred embodiments of the invention will now be described in detail below with reference to the accompanying drawings.

Figure 1:
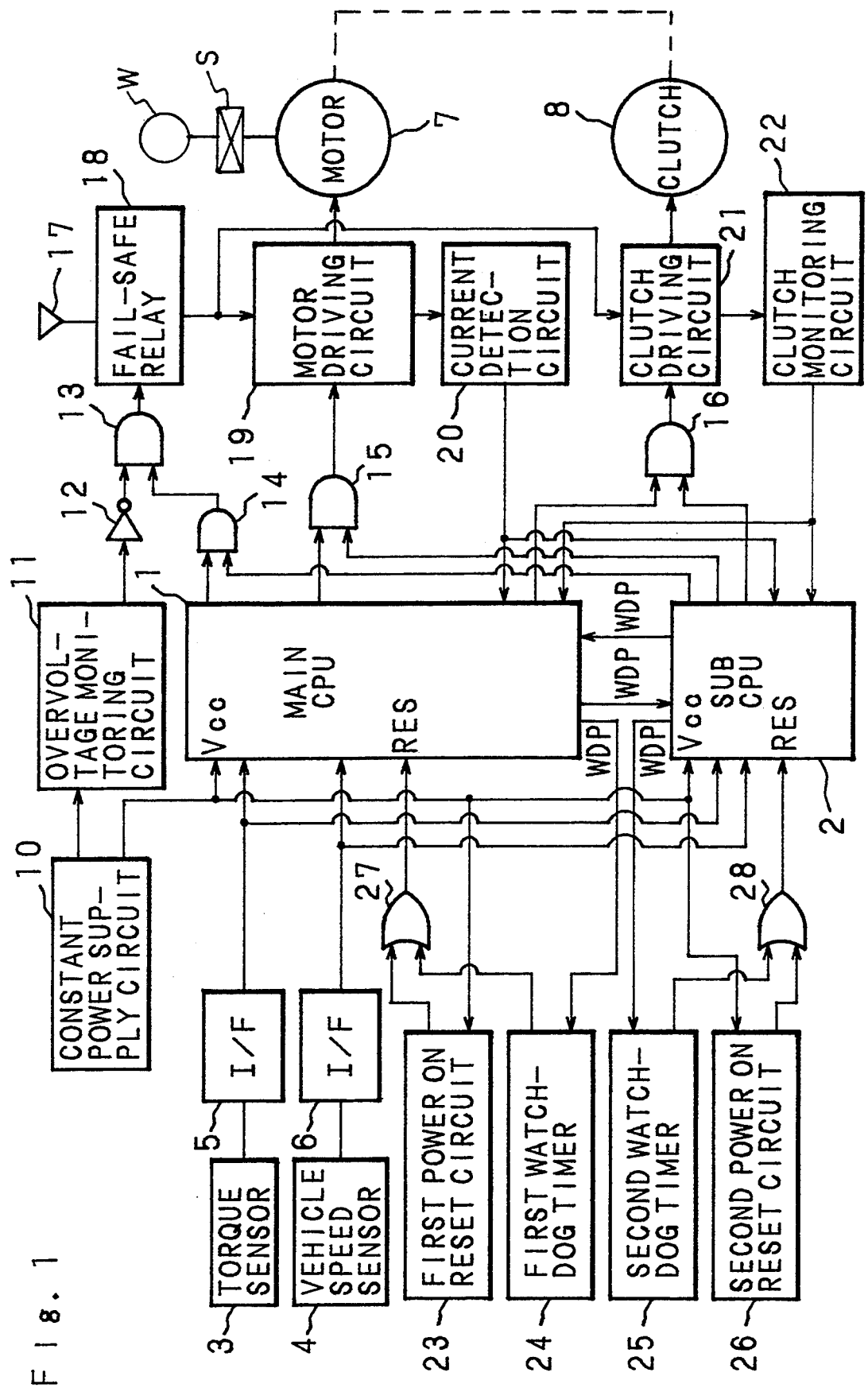
FIG. 1 is a block diagram illustrating the configuration of an electric power steering apparatus according to the invention.

FIG. 1 is a block diagram of an electric power steering apparatus according to the invention, which illustrates the configuration of a control system for a steering assisting motor and a clutch used to transmit the motor power to the steering shaft. In FIG. 1, the reference numeral 1 is a main CPU, a first controller; 2 is a sub CPU, a second controller; 3 is a torque sensor; 4 is a vehicle speed sensor; 7 is a steering assisting motor; and 8 is a clutch for engaging and disengaging the motor 7 to and from the steering shaft S of a steering wheel W.

A constant power supply circuit 10 applies a driving power Vcc to a power input terminal on each of the main CPU 1 and the sub CPU 2. The main CPU 1 and the sub CPU 2 each read a detected torque from a torque sensor 3 via an interface (I/F) 5 and a detected vehicle speed from a vehicle speed sensor 4 via an interface 6, and perform operations on the basis of the thus read values to control via control lines (not shown) a motor driving circuit 19 for control of a driving current for the motor 7 as well as the direction of rotation, forward or reverse, of the motor 7.

Indicated at 13, 14, 15 and 16 are AND gates each having two inputs. An output of an overvoltage monitoring circuit 11 is fed via an inverter 12 to one input of the AND gate 13 at the other input of which is applied an output signal from the AND gate 14. The output of the AND gate 13 is coupled to a fail-safe relay 18.

One input of each of the AND gates 14 to 16 is supplied with a signal from the main CPU 1, while the other input thereof is supplied with a signal from the sub CPU 2. The output of the AND gate 14 is coupled to one input of the AND gate 13, the output of the AND gate 15 is coupled to the motor driving circuit 19 for the motor 7, and the output of the AND gate 16 is coupled to the clutch driving circuit 21 for the clutch 8.

Each of the main CPU 1 and the sub CPU 2 monitors a watchdog pulse signal WDP which one CPU sends to the other CPU, and outputs a high level signal to the AND gates 14, 15, and 16 when it is judged that the one CPU is operating properly. When it is judged in the overvoltage monitoring circuit 11 that the voltage supplied from the constant power supply circuit 10 is not excessive, the fail-safe relay 18 is turned on so that power is supplied from a power supply 17 to the motor driving circuit 19 and the clutch driving circuit 21. Further, the AND gale 15 is set ON, activating the motor driving circuit 19 which then controls the driving of the motor 7 in accordance with control signals supplied from the main CPU 1 and the sub CPU 2. Furthermore, the AND gate 16 is set ON, activating the clutch driving circuit 21 to bring the clutch 8 into engagement.

The voltage from the constant power supply circuit 10 is supplied to the main CPU 1, the sub CPU 2, a first power-on reset circuit 23 that performs a power-on reset for the main CPU 1, and a second power-on reset circuit 26 that performs a power-on reset for the sub CPU 2, as well as to the overvoltage monitoring circuit 11 that monitors for application of an excessive voltage from the constant power supply circuit 10 to the main CPU 1 and the sub CPU 2.

The overvoltage monitoring circuit 11 outputs a low level signal when the voltage being applied from the constant power supply circuit 10 is not higher than a predetermined value, and a high level signal when it is higher than the predetermined value.

The motor driving circuit 19 and the clutch driving circuit 21 are connected in parallel to the power supply 17 via the fail-safe relay 18. Connected to the motor driving circuit 19 is a current detection circuit 20 which detects the driving current for the motor 7 and which supplies the value of the detected driving current to the main CPU 1 and the sub CPU 2.

The clutch driving circuit 21 is also coupled to a clutch monitoring circuit 22 which monitors the operating condition of the clutch 8 by detecting the terminal voltage for the clutch 8 (or the driving current for the clutch 8). The clutch monitoring circuit 22 makes a decision on the basis of the value of the terminal voltage (or the driving current) as to whether the clutch 8 is in an engaged condition or a disengaged condition, and supplies the result of the decision to the main CPU 1 and the sub CPU 2.

The main CPU 1 and the sub CPU 2 not only transfer watchdog pulse signals WDP between them to monitor the operating condition of each other, as described earlier, but the watchdog pulse signals WDP from the main and sub CPUs 1 and 2 are also fed to external circuits, i.e., first and second watchdog timers 24 and 25, respectively. The first power-on reset circuit 23 and the first watchdog timer 24 are coupled to an OR gate 27 which supplies a reset signal RES to the main CPU 1 for resetting. Similarly, the second power-on reset circuit 25 and the second watchdog timer 25 are coupled to an OR gate 28 which supplies a reset signal RES to the sub CPU 2 for resetting.

The first watchdog timer 24 measures the frequency of the watchdog pulse signal WDP that is output at a fixed rate from the main CPU 1, compares the measured value of the frequency with a predetermined reference value for the frequency, and outputs a low level signal when these values substantially agree with each other and a high level signal when they do not agree, that is, when an abnormal condition has occurred. The outputs of the first watchdog timer 24 and the first power-on reset circuit 23 are coupled to the respective inputs of the OR gate 27 whose output is connected to a terminal on the main CPU 1, at which terminal is applied the reset signal RES.

The first power-on reset circuit 23 is a circuit that resets the operation of the main CPU 1 during the power-on of the main CPU 1 until the oscillator in the main CPU 1 starts operating normally thereby preventing abnormal operation of the main CPU 1 during the power-on thereof. This is accomplished by holding its output signal at a high level for a prescribed length of time after the voltage of the constant power supply circuit 10 has risen to a rated value and by setting the output signal to a low level after the prescribed length of time has elapsed.

On the other hand, the second watchdog timer 25 measures the frequency of the watchdog pulse signal WDP that is output at a fixed rate from the sub CPU 2, compares the measured value of the frequency with a predetermined reference value for the frequency, and outputs a low level signal when these values substantially agree with each other and a high level signal when they do not agree, that is, when an abnormal condition has occurred. The outputs of the second watchdog timer 25 and the second power-on reset circuit 226 are coupled to the respective inputs of the OR gate 28 whose output is connected to a terminal on the sub CPU 2, at which terminal is applied the reset signal RES.

The second power-on reset circuit 26 is a circuit that resets the operation of the sub CPU 2 during the power-on of the sub CPU 2 until the oscillator in the sub CPU 2 starts operating normally, thereby preventing abnormal operation of the sub CPU 2 during the power-on thereof. This is accomplished by holding its output signal aL a high level for a prescribed length of time after the voltage of the constant power supply circuit 10 has risen to a rated value and by setting the output signal to a low level after the prescribed length of time has elapsed.

When one or other of the signals input from the first watchdog timer 24 and the first power-on reset circuit 23 is high, the output signal of the OR gate 27 is set high, thus applying the reset signal RES to the terminal of the main CPU 1 and thereby resetting the main CPU 1 during the power-on thereof or when abnormality is detected in the watchdog pulse signal WDP supplied from the main CPU 1, as a result of which a low level signal is applied to the AND gates 14 to 16.

On the other hand, when one or other of the signals input from the second watchdog timer 25 and the second power-on reset circuit 26 is high, the output signal of the OR gate 28 is set high, thus applying the reset signal RES to the terminal of the sub CPU 2 and thereby resetting the sub CPU 2 during the power-on thereof or when abnormality is detected in the watchdog pulse signal WDP supplied from the sub CPU 2, as a result of which a low level signal is applied to the AND gates 14 to 16.

In the above apparatus of the invention, the first watchdog timer 24 and the second watchdog timer 25 accept the watchdog pulse signals WDP output from the main CPU 1 and the sub CPU 2, respectively, and when there is abnormality in The received watchdog pulse signal WDP the receiving watchdog timer outputs a low level signal. On the other hand, the first power-on reset circuit 23 and the second power-on reset circuit 26 both output a high level signal during the power-on of the main CPU 1 and the sub CPU 2, respectively, until the voltage being supplied from the constant power supply circuit 10 has stabilized after rising to a rated value, during which period the reset signals RES are applied to the RES terminals of the main CPU 1 and the sub CPU 2 via the OR gates 27 and 28, respectively, thus resetting the main CPU 1 and the sub CPU 2.

When either one or both of the main CPU 1 and the sub CPU 2 are reset, either one or both of the main CPU 1 and the sub CPU 2 output low level signals to the AND gates 14 to 16, as a result of which the fail-safe relay 18 is turned off to deactivate the motor driving circuit 19 and the clutch driving circuit 21, thereby stopping the motor 7 and disengaging the clutch 8 to disconnect the steering assisting power, thus disabling the steering power-assist.

On the other hand, when it is judged in the overvoltage monitoring circuit 11 that the voltage being supplied from the constant power supply circuit 10 is excessive, the output of the overvoltage monitoring circuit 11 goes high so that the fail-safe relay 18 is turned off, thereby stopping the motor 7 and disengaging the. clutch 8, as in the above case.

In the above described example of the embodiment, the motor driving circuit 19 and the clutch driving circuit 21 are simultaneously deactivated at the same time that the fail-safe relay 18 is turned off. It will be appreciated, however, that the motor driving circuit 19 alone may be deactivated to stop the motor 7, or the clutch driving circuit 21 alone may be deactivated to disengage the clutch 8, or alternatively, the fail-safe relay 18 alone may be turned off to stop the motor 7 and disengage the clutch 8 simultaneously.

The above apparatus of the invention has the configurational features that the main CPU 1 and the sub CPU 2 share the same power supply (the constant power supply circuit 10), that the main CPU 1 and the sub CPU 2 are coupled to separate power-on reset circuits (the first power-on reset circuit 23 and the second power-on reset circuit 26), that the overvoltage monitoring circuit 11 is coupled to the constant power supply circuit 10 which supplies power to the main CPU 1 and the sub CPU 2, and that the gate circuits 12 to 16 are provided which act to disable the fail-safe relay 18, the motor driving circuit 19, and the clutch driving circuit 21 unless the main and sub CPUs 1 and 2 are both operating normally.

With these features, the apparatus of the invention provides the following advantages. Since the main CPU 1 and the sub CPU 2 share the same power supply, there is eliminated the phenomenon that one CPU causes a latch-up of the other CPU because of a difference in supply voltage; furthermore, the number of power supply circuits can be reduced as compared with the prior art configuration, and reduction in the production cost is thus achieved. The provision of the power-on reset circuits for the main CPU 1 and the sub CPU 2 serves to prevent the two CPUs from going out of control simultaneously when one of the reset circuits has failed, and thus ensures safety. Furthermore, the provision of the gate circuits 12 to 16 ensures the system safety when the sub CPU 2 has gone out of control or even when the two CPUs have gone out of control simultaneously. Also, the overvoltage monitoring circuit 11 connected to the constant power supply circuit 10 protects the system safety by turning off the fail-safe relay 18 when the main CPU 1 and the sub CPU 2 have gone out of control simultaneously because of power failure.

Figure 2:
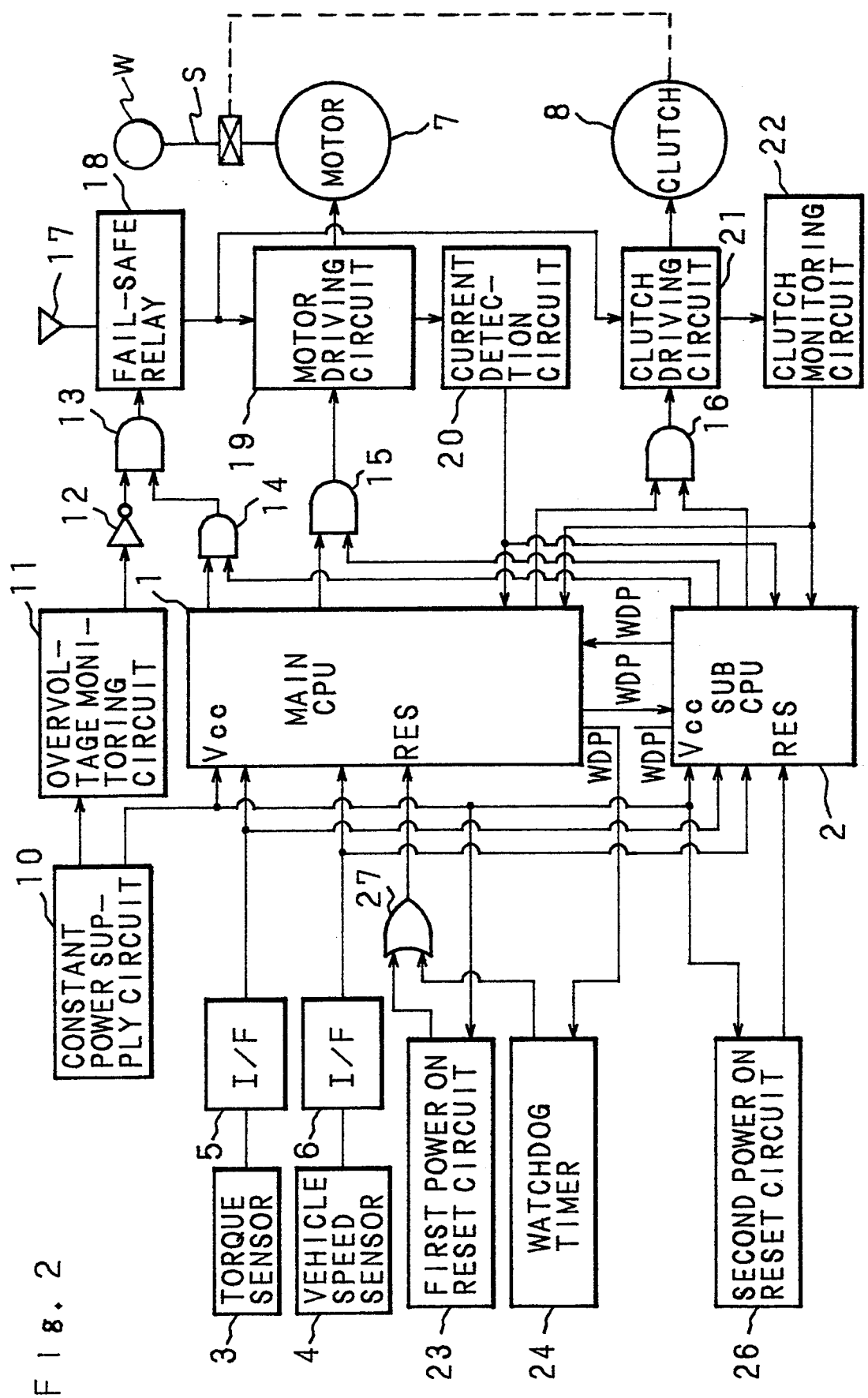
FIG. 2 is a block diagram showing another embodiment of the invention.

FIG. 2 is a block diagram showing another embodiment of the invention. In this embodiment, only the main CPU 1 is connected to an external watchdog timer 24, and a watchdog timer is not provided for the sub CPU 2.

Otherwise, the configuration and the operation of this embodiment are fundamentally the same as those of the embodiment shown in FIG. 1; corresponding parts are designated by the same reference numerals as those in FIG. 1, and explanatory descriptions of such parts are omitted herein.

The configuration of this embodiment is such that only the watchdog pulse signal WDP being output from the main CPU 1 that controls the steering assisting operation is monitored by the watchdog timer 24, and that the main CPU 1 accepts the watchdog pulse signal WDP transferred from the sub CPU 2 and compares it with the clock pulse signal of its own judged as normal by the watchdog timer 24. As a result of the comparison, when there is abnormality in the watchdog pulse signal WDP being output from the sub CPU 2, the main CPU 1 outputs a low level signal to each of the AND gates 14, 15, and 16, to disable the fail-safe relay 18, the motor driving circuit 19, and the clutch driving circuit 21, thus ensuring satisfactory system safety while achieving a reduction in the number of circuits used.

Figure 3:
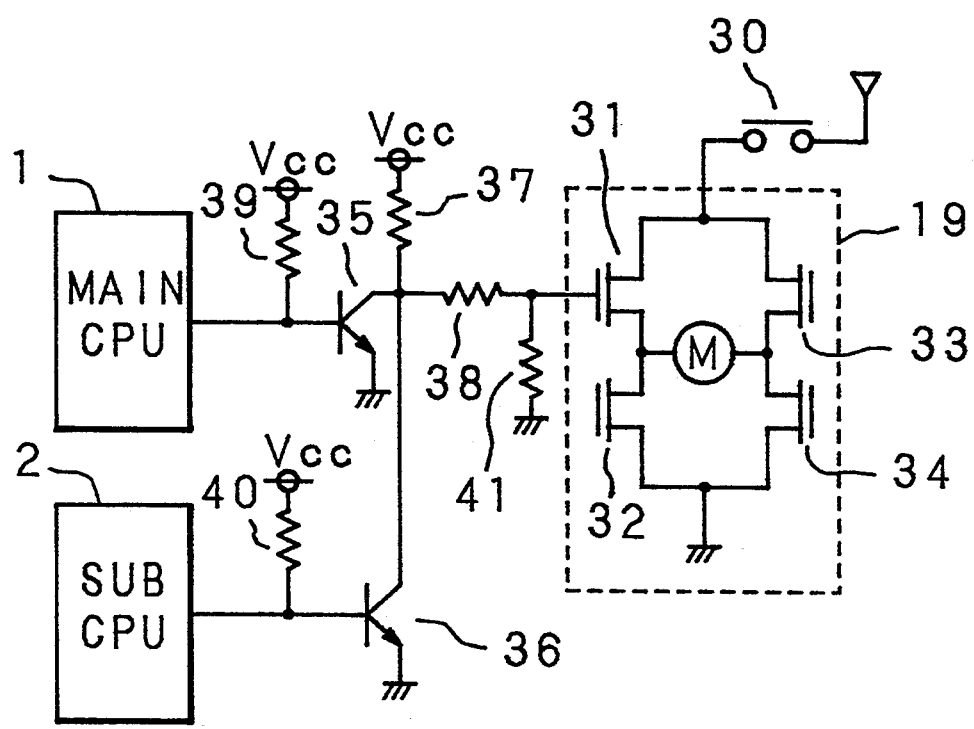
FIG. 3 is a circuit diagram showing a further embodiment of the invention.

FIG. 3 is a circuit diagram showing a further embodiment of the invention. In this embodiment, the motor driving circuit 19 is deactivated by utilizing the phenomenon that the respective ports of the main and sub CPUs 1 and 2 are put in a high impedance state when the CPUs 1 and 2 are reset.

The motor driving circuit, 19 is constructed with four n-channel MOS transistors 31 to 34, the n-channel MOS transistor pairs 31, 32 and 33, 34 forming respective series circuits which are connected in parallel with each other. One end of this parallel circuit is connected to a battery via a switch 30 which is activated by the fail-sale relay, and the other end of the circuit is grounded, with a motor M being connected between a node of the n-channel MOS transistors 31 and 32 and a node of the n-channel MOS transistors 33 and 34.

The gates of the n-channel MOS transistors 31 to 34 are connected to the main CPU 1 and the sub CPU 2 via circuits of identical configuration. In FIG. 3, only the connecting circuit for the gate of the n-channel MOS transistor 31 is shown.

As can be seen from FIG. 3, the gate of the n-channel MOS transistor 31 is connected to the respective ports of the main CPU 1 and the sub CPU 2 via transistors 35 and 36, respectively. The bases of the transistors 35 and 36 are connected to the main CPU 1 and the sub CPU 2, respectively, and their collectors are connected to the supply voltage Vcc via a resistor 37 and also to the gate of the n-channel MOS transistor 3I via a resistor 38. Their emitters are grounded.

The supply voltage Vcc is connected between the ports of the main CPU 1 and the sub CPU 2 and the bases of the transistors 35 and 36 via pull-up resistors 39 and 40, respectively. Further, a node between the resistor 37 and the gate of the n-channel MOS transistor 31 is grounded via a pull-down resistor 41.

In this embodiment, normally the switch 30 is on so that the battery voltage is applied to the motor driving circuit 19. A control signal is applied from the main CPU 1 or the sub CPU 2 to the gates of the n-channel MOS transistors 31 to 34; for steering to the right, for example, a PWM signal is applied to the gate of the n-channel MOS transistor 31 and the n-channel MOS transistor 34 is turned on so that the motor M rotates in clockwise direction to assist the steering force.

For steering to the left, on the other hand, the PWM signal is applied to the gate of the n-channel MOS transistor 33 and the n-channel MOS transistor 32 is turned on so that the motor M rotates in counterclockwise direction to assist the steering force.

When the main CPU 1 or the sub CPU 2 is reset, the corresponding port, is put in a high impedance state, and by the action of the pull-up resistor 39 or 40, the transistor 35 or 36 is turned on, so that the control signals for the gates of the n-channel MOS transistors 31 to 34 are set low by the action of the pull-down resistor 41, which causes all the n-channel MOS transistors 31 to 34 to turn off to deactivate the motor M.

Figure 4:
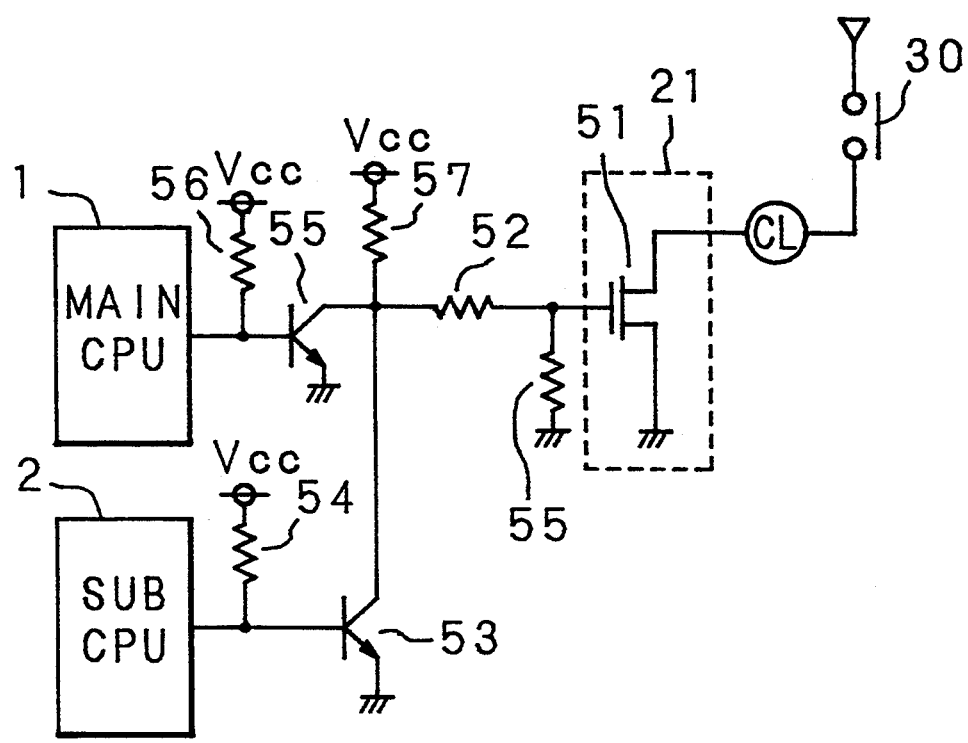
FIG. 4 is a circuit diagram showing still another embodiment of the invention.

FIG. 4 is a circuit diagram showing still another embodiment of the invention. In this embodiment, the clutch driving circuit 21 is deactivated by utilizing the phenomenon that the respective ports of the main CPU 1 and the sub CPU 2 are put in a high impedance state when the CPUs 1 and 2 are reset.

The clutch driving circuit 21 is constructed with an n-channel MOS transistor 51, one terminal of which is connected to a clutch CL and to a battery via a switch 30 which is activated by the fail-safe relay, and the other terminal of which is grounded.

The gate of the n-channel MOS transistor 51 is connected to the respective ports of the main CPU 1 and the sub CPU 2 via transistors 55 and 53, respectively. The bases of the transistors 55 and 53 are connected to the main CPU 1 and the sub CPU 2, respectively, and their collectors are connected to the supply voltage Vcc via a resistor 57 and also to the gate of the n-channel MOS transistor 51 via a resistor 52. Their emitters are grounded.

The supply voltage Vcc is connected between the ports of the main CPU 1 and the sub CPU 2 and the bases of the transistors 55 and 53 via pull-up resistors 56 and 54, respectively. Further, a node between the resistor 57 and the gale of the n-channel MOS transistor 51 is grounded via a pull-down resistor 55.

In this embodiment, normally the switch 30 is on by the action of the fail-safe relay, and the control signal from the main CPU 1 to the gate of the n-channel MOS transistor 51 is set at a high level so that the n-channel MOS transistor 51 is turned on to bring the clutch into engagement.

On the other hand, when the main CPU 1 or the sub CPU 2 is reset, the corresponding port is put in a high impedance state, and by the action of the pull-up resistor 56 or 54, the transistor 55 or 53 is turned on, so that the control signal for the gate of the n-channel MOS transistor 51 is set low by the action of the pull-down resistor 55. As a result, the n-channel MOS transistor 51 is turned off, thus disengaging the clutch CL.

In the embodiments shogun in FIGS. 3 and 4, the configuration is such that both the main CPU 1 and the sub CPU 2 output control signals to disable the steering power-assist by the motor, but alternatively, it may be so configured that such control signals are output only from one CPU.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A control circuit for an electric power steering apparatus in which the output of a steering assisting electric motor is transmitted to a steering wheel through a clutch comprising:

a first controller for controlling the actuation of the steering assisting electric motor and a second controller for monitoring the operation of the first controller;

a power supply connected in common to both said first and second controllers for supplying a power-on voltage for the first and second controllers:

means for monitoring the power supply for an excessive voltage;

circuit means connected to the first and second controllers for performing power-on and reset operations on the respective controllers, said circuit means resetting the operations of the respective controllers for a prescribed length of time until the voltage being supplied from the power supply for the controllers rises to a rated value after power-on of the controllers;

switching circuit means for supplying power to actuate the motor and the clutch; and a gate circuit for accepting signals output from said first and second controllers indicating whether the controllers are operating normally and activating said switching circuit to supply power for engagement of the clutch and the actuation of the electric motor only when the power supply for the controllers is delivering a voltage which is not excessive and both the first and second controllers are operating normally and for deactivating the motor and disengaging said clutch when at least one of said first and second controllers is reset.

2. A control circuit for an electric power steering apparatus in which the output of a steering assisting electric motor is transmitted to a steering wheel through a clutch comprising:

a first controller for controlling the actuation of the steering assisting electric motor and a second controller for monitoring the operation of the first controller;

a power supply, connected in common to both said first and second controllers for supplying a power-on voltage for said controllers;

circuit means connected to the first and second controllers for performing power-on and reset operations on the respective controllers and which resets the operations of the respective controllers for a prescribed length of time until the voltage being supplied from the power supply for the controllers rises to a rated value after power-on of the controllers; and a gate circuit for deactivating the motor and disengaging said clutch when at least one or other of the first and second controllers is reset.

3. A control circuit for an electric power steering apparatus according to claim 2, further comprising:
a motor driving circuit having at least one transistor for controlling the energization of the motor; and
a circuit for de-energizing said at least one transistor when at least one of said first and second controllers is reset and an output of such controller is put in a high impedance state.

4. A control circuit for an electric power steering apparatus according to claim 2, further comprising:
a clutch driving circuit having at least one transistor for controlling the activation of the clutch; and
a circuit for de-energizing the transistor at least one of said first and second controllers reset and an output of such controller is put in a high impedance state.

* * * * *